US012682070B2

(12) United States Patent
Zech et al.

(10) Patent No.: US 12,682,070 B2
(45) Date of Patent: Jul. 14, 2026

(54) RETRAINING MACHINE LEARNING MODEL FOR COMPUTER VULNERABILITY EXPLOITATION DETECTION

(71) Applicant: ECS Federal, LLC, Fairfax, VA (US)

(72) Inventors: Anthony Zech, Minneapolis, MN (US); Michael Morley, Minneapolis, MN (US); Josiah Caprino, Alexandria, VA (US)

(73) Assignee: ECS Federal, LLC, Fairfax, VA (US)

( * ) Notice: Subject to any disclaimer, the term of this patent is extended or adjusted under 35 U.S.C. 154(b) by 239 days.

(21) Appl. No.: 18/176,319

(22) Filed: Feb. 28, 2023

(65) Prior Publication Data

US 2024/0289465 A1 Aug. 29, 2024

(51) Int. Cl.
*G06F 21/57* (2013.01)
*G06F 21/55* (2013.01)
*G06N 20/00* (2019.01)

(52) U.S. Cl.
CPC .......... *G06F 21/577* (2013.01); *G06F 21/552* (2013.01); *G06N 20/00* (2019.01)

(58) Field of Classification Search
CPC ................. G06F 21/577; G06F 21/552; G06F 2221/034; G06F 18/00; G06F 18/20; G06F 18/24; G06N 20/00; G06N 3/08;

G06N 3/045; G06N 7/01; G06N 5/022; G06N 5/025; G06N 20/20; H04L 63/1433; H04L 63/1416
See application file for complete search history.

(56) References Cited

U.S. PATENT DOCUMENTS

| | | | | |
|---|---|---|---|---|
| 2016/0103838 A1* | 4/2016 | Sainani | ................... | G06F 16/24 707/725 |
| 2019/0253443 A1* | 8/2019 | Vasudevan | ............. | H04L 67/12 |
| 2021/0073618 A1* | 3/2021 | Boussarov | ............ | G06N 3/082 |
| 2023/0259635 A1* | 8/2023 | Bao | ........................ | G06F 21/552 726/22 |
| 2023/0274136 A1* | 8/2023 | Zwolak | .................. | G06N 10/40 706/25 |
| 2024/0007492 A1* | 1/2024 | Shen | ................... | H04L 63/1425 |
| 2024/0045410 A1* | 2/2024 | Mani Iyer Ramani | ...................... G05B 23/0248 |
| 2024/0144074 A1* | 5/2024 | Arroyo | ................... | G06N 3/09 |

* cited by examiner

*Primary Examiner* — Wasika Nipa
*Assistant Examiner* — Edgar W Xie
(74) *Attorney, Agent, or Firm* — Knobbe, Martens, Olson & Bear, LLP

(57) ABSTRACT

Systems and methods may be used to determine a computer vulnerability exploit via use of a machine learning model. Vulnerability content data may be received from one or more vulnerability feeds or data stores. The vulnerability content data may be categorized as either training data or inference data. A machine learning model may be trained based on the training data and then used to predict exploits of computer vulnerabilities identified in the inference data.

18 Claims, 5 Drawing Sheets

300

RETRAINING MACHINE LEARNING MODEL FOR COMPUTER VULNERABILITY EXPLOITATION DETECTION

BACKGROUND

Vulnerability information, such as computer vulnerabilities, may be shared to individuals and/or entities via private and/or public entities.

DETAILED DESCRIPTION

Figure 1:
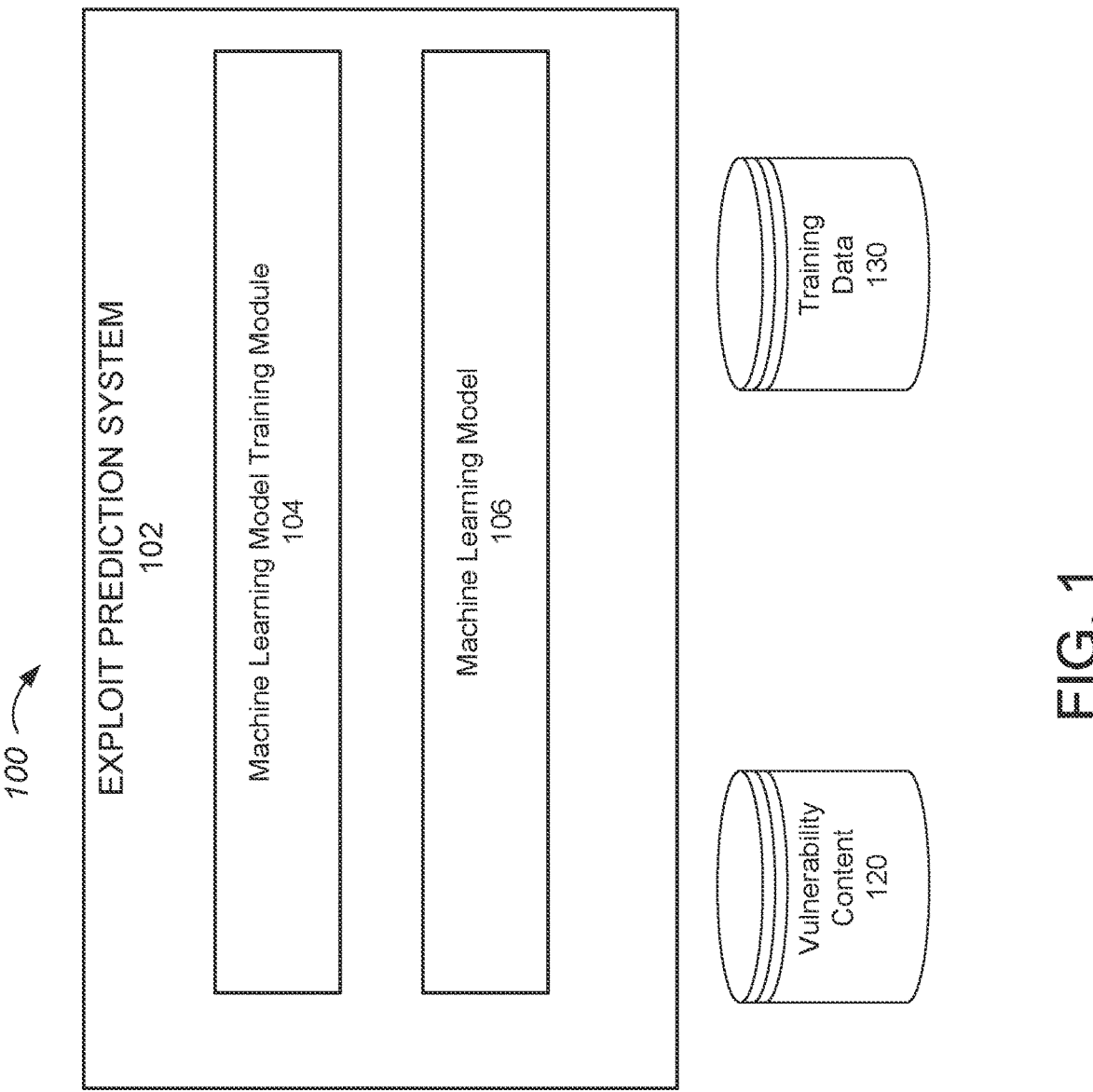
FIG. 1 is a block diagram illustrating an example exploit prediction environment.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for case of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including." "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could." "might." "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining." "in response to detecting." and/or the like, depending on the context. Similarly, the phrase "if it is determined" or "if [a stated condition or event] is detected" is, optionally, construed to mean "upon determining." "in response to determining." "upon detecting [the stated condition or event]," "in response to detecting [the stated condition or event]," and/or the like, depending on the context. Also, as used herein, the terms "has," "have," "having." or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Software, firmware, and hardware vulnerabilities (generically referred to as computer vulnerabilities) are pervasive. Given the large number of computer vulnerabilities, it can be difficult if not impossible for companies to fix them all given the limited amount of resources at their disposal. Moreover, only some of the computer vulnerabilities may ever be exploited and an even smaller number may negatively impact a particular company. Notwithstanding the relative low probability that a particular company is affected by a particular computer vulnerability, if they are, the damages may be in the millions of dollars or more. Given the many potential attack points (from different vulnerabilities), small probability of attack, but high damage if attacked, it can be difficult for entities to properly allocate resources to address the computer vulnerabilities. Moreover, given the thousands or millions of computer vulnerabilities, it may be impossible for a person to predict which computer vulnerabilities will be exploited.

As described herein, an exploitation prediction system may use one or more machine learning models to predict the likelihood that a particular computer vulnerability will be exploited. In some cases, the machine learning model(s) may be implemented as multilayer perceptron (MLP) model (s). In some cases, the exploitation prediction system may also predict when the computer vulnerability will be exploited and how pervasive the exploitation will be (e.g., how many entities are likely to be affected).

In some cases, the exploitation prediction system may use data from databases that track, in real-time, known computer vulnerabilities and when they are exploited (also referred to herein as computer vulnerability content data) to train the machine learning models (e.g., as training data) and to predict when the computer vulnerabilities will be exploited (e.g., as inference data). The computer vulnerability content data used to train the machine learning model may be referred to herein as training data and the computer vulnerability content data used to predict whether a computer vulnerability will be exploited may be referred to herein as inference data.

The databases may include thousands or millions of entries of computer vulnerabilities and many fields per entry (e.g., as structured data). As such, it may be infeasible or impossible for a person to review the data and make real-time predictions of what computer vulnerabilities are likely to be exploited.

Moreover, as the information in these databases may be updated in real-time and/or asynchronously and frequently with additional information regarding new, known computer vulnerabilities and/or the exploitation of these computer vulnerabilities, the trained machine learning models may become stale (e.g., because they relied upon earlier computer vulnerability content data as training data, which is now outdated and potentially inaccurate). The use of stale machine learning models may result in less accurate predictions regarding future exploitations of computer vulnerabilities. To address these issues, the exploitation prediction system may automatically retrain machine learning models as new data is received at the databases. In some cases, the exploitation prediction system may retrain machine learning models based on a retraining schedule or a predetermined time period, such as one or multiple times a day and/or based on a threshold number of additions to the databases (e.g., the addition of new computer vulnerabilities or the addition of information regarding the exploitation of computer vulnerabilities).

Retraining a machine learning model may be complicated and difficult as it may include the annotation of ground truth data, the partitioning of training data for different parts of the training process, the selection and testing of hyperparameters for the machine learning model, and the training and testing of the machine learning model. For this reason, in many instances, machine learning models are tuned infrequently (e.g., every few months, etc.). However, given the frequently changing nature of the underlying training data (and ground truth data) for the exploitation prediction system, retraining the machine learning model every few months may result in inaccurate predictions the majority of the time. To address the training issue, the exploitation prediction system may include a training system that automatically selects and tests hyperparameters for the machine learning model, partitions the training data, and trains and tests the machine learning model before deploying the trained machine learning model for use.

Accordingly, an exploit prediction system may use a machine learning model (e.g., an MLP model) to at least predict whether there will be an exploit (e.g., probability or risk score) on cybersecurity and/or computer vulnerabilities by analyzing computer vulnerability content data. As described herein, the computer vulnerability content data may be categorized by when the exploit prediction system received the data (e.g., less than two weeks or greater than two weeks, etc.) and whether the computer vulnerability has already been exploited. In some cases, certain exploited and non-exploited sets of data may be categorized as training data on which the machine learning model can train, and retrain, on. Furthermore, certain non-exploited sets of data (e.g., received less than two weeks and not exploited) may be categorized as inference data on which the trained machine learning model may make predictions.

FIG. 1 is a block diagram illustrating an example exploit prediction environment 100. In the illustrated example, the exploit prediction environment 100 includes an exploit prediction system 102, vulnerability content 120, and training data 130. The exploit prediction system 102 includes a machine learning training module 104 and a machine learning model 106. In some cases, the exploit prediction system 102 may generate the training data 130 using at least some of the vulnerability content 120, train the machine learning model 106 using the training data 130 and the MLM training module 104, and predict exploitations using at least some of the vulnerability content 120 (e.g., inference data that is a different part of the vulnerability content 120 than what is used to generate the training data 130).

The vulnerability content 120 may be stored in one or more data stores and/or other computing storage mechanisms communicatively coupled with the exploit prediction system 102. The vulnerability content 120 may include computer vulnerability content data which may be used to predict exploits. In some cases, the vulnerability content 120 may include data or feeds, which may provide cybersecurity threat information and/or other computer vulnerability information which may be used to predict whether such threats and/or vulnerabilities will be exploited. In certain cases, the vulnerability content 120 may include data entries that identify computer vulnerabilities, the date when the computer vulnerabilities were identified and/or made public, and a date when the computer vulnerability was exploited (if it has been exploited). The data entries may include additional information, such as but not limited to, the software/hardware affected by the computer vulnerability (including version ID, etc.), manufacturer or company that develops/sells the underlying software/hardware affected by the computer vulnerability, type of vulnerability (e.g., hardware, software, domain attacks, server, IP protocol, etc.) etc. In some cases, the data entries may be structured as structured data in a table format with fields and field values. Moreover, the data entries may include annotations (e.g., made before the machine learning model 106 is trained and/or hyperparameters are determined).

The vulnerability content 120 may include data or feeds from public (including quasi-public) and/or private entities. As an example, a public vulnerability content 120 may be provided by Department of Homeland Security (DHS) or the National Institute of Standards and Technology (NIST). More specifically, DHS's Cybersecurity & Infrastructure Security Agency (CISA) may provide cybersecurity bulletins and/or advisories which may be automatically fed or manually pulled from DHS CISA's systems as part of the vulnerability content 120.

In some cases, the vulnerability content 120 may also include private data or feeds such as a feed which provides cybersecurity vulnerability information that was collected, analyzed, and labeled by a private entity, such as GreyNoise Intelligence. Other private entity vulnerability content 120 may include data or feeds that provide darknet (e.g., a computer network with restricted access that is used (primarily) for illegal file sharing) monitoring from vendors such as Intel 471. Another example of a private vulnerability content 120 may provide information such as malicious sightings including suspicious files, suspicious uniform resource locators (URLs), suspicious domains and suspicious internet protocol (IP) addresses to detect malware from a vendor such as VirusTotal. Also, private entity vulnerability content 120 may include crowd sourced cybersecurity threat detection via a blockchain enabled solution such as from a vendor like PolySwarm.

As described herein, in some cases, the vulnerability content 120 may be separated into different categories, where one or more sets of data are used as inference data (e.g., to predict whether computer vulnerabilities will be exploited), and one or more (different) sets of data are used as training data (e.g., to train the machine learning model 106 to predict the exploitation of computer vulnerabilities). As a non-limiting example, the vulnerability content 120 may be separated into two sets: vulnerability content 120 that has been published less than a threshold time period (e.g., one or more days, weeks, months, etc.) and has not been exploited, and vulnerability content 120 that has been published greater than the threshold time period (e.g., one or more days, weeks, months, etc.) or has been exploited. In some such cases, the second set may be identified as training data 130 and used by the MLM training module 104 to train the machine learning model 106 and the first set of data may be used by the (trained) machine learning model 106 to predict the exploitation of computer vulnerabilities.

As another non-limiting example, the vulnerability content 120 may be categorized into six sets of data. The first set of data may include vulnerability content 120 that has been published less than a threshold time period (e.g., two weeks) and has been exploited. The second set of data may include vulnerability content 120 that has been published for more than the threshold time period, has been exploited, and is determined to be within a threshold number of standard deviations of error (e.g., two standard deviations). The third set of data may include vulnerability content 120 that has been published for more than the threshold time period, has been exploited, and is determined with more than the threshold number of standard deviations. This third set may be used to identify exploits that were outliers and had a longer burn time than expected, or, in other words, took longer to be exploited than expected. The fourth set of data may include vulnerability content 120 that has been published for more than the threshold time period, has not been exploited, and is determined to be within the threshold number of standard deviations. The fifth set of data may include vulnerability content 120 that has been published for more than the threshold time period, has not been exploited, and is determined with more than the threshold number of standard deviations. Lastly, the sixth set of data may include vulnerability content 120 that has been published for less than the threshold time period and has not been exploited.

The training data 130 may include data or content stored in a data store or other storage mechanism (same or different than the vulnerability content 120) that may be used to train and/or retrain the machine learning model 106. As described herein, in some cases, the vulnerability content 120 may be separated into different sets of data (e.g., different categories), where one or more sets are used for inference, and one or more different sets of data are used for training. For example, with reference to the six sets of data described previously, the training data 130 may (only) be the first through five sets of data (and used by the MLM training module 104 to train the machine learning model 106) and the sixth set of data may be used by the (trained) machine learning model 106 to predict the exploitation of computer vulnerabilities.

By separating the vulnerability content 120 into different sets of data (some used for training and others used for inference), the exploit prediction system 102 can improve the results and/or performance of the machine learning model 106. For example, the machine learning model 106 may be used on data that is different from the data on which it is trained. In some cases, the vulnerability content 120 may be referred to as a set of computer vulnerability data, the set of data used to train the machine learning model 106 may be referred to as a first subset of computer vulnerability data (of the set of set of computer vulnerability data), and the set of data used by the machine learning model 106 to determine the likelihood of exploitation may be referred to as a second subset of computer vulnerability data (of the set of set of computer vulnerability data).

The MLM training module 104 may be used to train or retrain the machine learning model 106. In certain cases, the MLM training module 104 may be implemented as a hyperparameter optimization framework, such as but not limited to, as a Keras, Ray-Tune, Optuna, Hyperopt, Polyaxon, Talos, etc. As part of training and/or retraining the machine learning model 106, the MLM training module 104 may determine hyperparameters for the machine learning model 106 associated with exploit prediction system 102 via use of a tuner. As such, the MLM training module 104 may be used to determine a proper setting and/or configuration of the machine learning model 106, number of hidden layers, number of units for each hidden layer, learning rate number of neurons, activation function, optimizer, batch size, epochs, among other hyperparameters.

In some cases, the MLM training module 104 may perform training automatically without human intervention. In some such cases, the MLM training module 104 may (automatically) train the machine learning model 106 at predetermined or variable time intervals. For example, the MLM training module 104 may be configured to retrain the machine learning model 106 every two hours, ten hours, once a day, once a month, etc. In this way, the MLM training module 104 may keep the machine learning model 106 from going stale (e.g., trained on outdated or possibly inaccurate vulnerability content 120).

In certain cases, the MLM training module 104 may automatically train the machine learning model 106 based on a change to the vulnerability content 120. As described herein, the vulnerability content 120 may change frequently as new computer vulnerabilities are identified and/or exploited.

In some cases, the MLM training module 104 may automatically train the machine learning model 106 when the quantity of computer vulnerabilities that has been exploited since the last training satisfies a vulnerability exploitation threshold. For example, if one thousand vulnerabilities had been exploited when the MLM training module 104 was previously trained (e.g., time TO) and the vulnerability exploitation threshold is fifty, then when fifty additional computer vulnerabilities are exploited, the MLM training module 104 may automatically train the machine learning model 106.

In certain cases, the MLM training module 104 may automatically train the machine learning model 106 when a quantity of (newly identified) computer vulnerabilities that have been added to the vulnerability content 120 satisfies an added vulnerability threshold. For example, if the vulnerability content 120 included 10,000 computer vulnerabilities when the MLM training module 104 was previously trained (e.g., time TO) and the added vulnerability threshold is 100, then when 100 additional computer vulnerabilities are added to the vulnerability content 120, the MLM training module 104 may automatically train the machine learning model 106.

In some cases, the MLM training module 104 may automatically train the machine learning model 106 when some number (e.g., a threshold number) of computer vulnerabilities age beyond the threshold time period. For example, if the threshold time period is two weeks and the threshold number of computer vulnerabilities is five, the MLM training module 104 may automatically retrain the machine learning model 106 when it determines that five computer vulnerabilities have been published for more than two weeks.

In some cases, the MLM training module 104 may use any combination of vulnerability exploitation threshold and/ or added vulnerability threshold to determine when to train the machine learning model 106.

The machine learning model 106 may be configured to predict when computer vulnerabilities may be exploited. In certain cases, the machine learning model 106 may also predict when and the extent of the exploitation. In some cases, the machine learning model 106 may be implemented as an MLP model, such as but not limited to a Sigmoid function or a Rectified Linear Unit (ReLU), while using Stochastic Gradient Descent as an optimizing function, Adaptive Moment Estimation (adam), Adam with Nesterov momentum (nadam), Root Mean Square Propagation (rmsprop), Adaptive Gradient Algorithm (Adagrad), Adaptive Gradient Algorithm per-dimension (Adadelta), and Variant of Adam based on the infinity norm (Adamax).

The machine learning model 106 may be setup and/or configured to have more than one hidden layers based on the expected performance and/or results associated with predicting exploits from vulnerability information. As stated above, a MLM training module 104, such as a hyperparameter tuner (e.g., Keras tuner), may be used to determine the hyperparameter setup and/or configuration for the machine learning model 106.

In some cases, the machine learning model 106 may be implemented as an MLP. An MLP model is a form of artificial intelligence using neural networks. MLP models may have, but are not limited to, at least three layers, an input layer, a hidden layer, and an output layer. MLP models fall under the category of feedforward algorithms, because inputs are combined with the initial weights in a weighted sum and subjected to an activation function and each linear combination may propagated to the next layer. In other words, each layer is feeding the next one with the result of their computation, their internal representation of the data going all the way through the hidden layers to the output layer. Backpropagation is the learning mechanism that allows MLP models to iteratively adjust the weights in the network, with the goal of minimizing a cost function.

MLP models may be tuned to increase accuracy and/or improve performance of predictions. Tuning of MLP models may be done by using a tuner, such as Keras tuner, to make modifications and/or adjustments to hyperparameters associated with an MLP model. Hyperparameters may be parameters such as number of hidden layers, number of units for each hidden layer, learning rate number of neurons, activation function, optimizer, batch size, and epochs.

Figure 2:
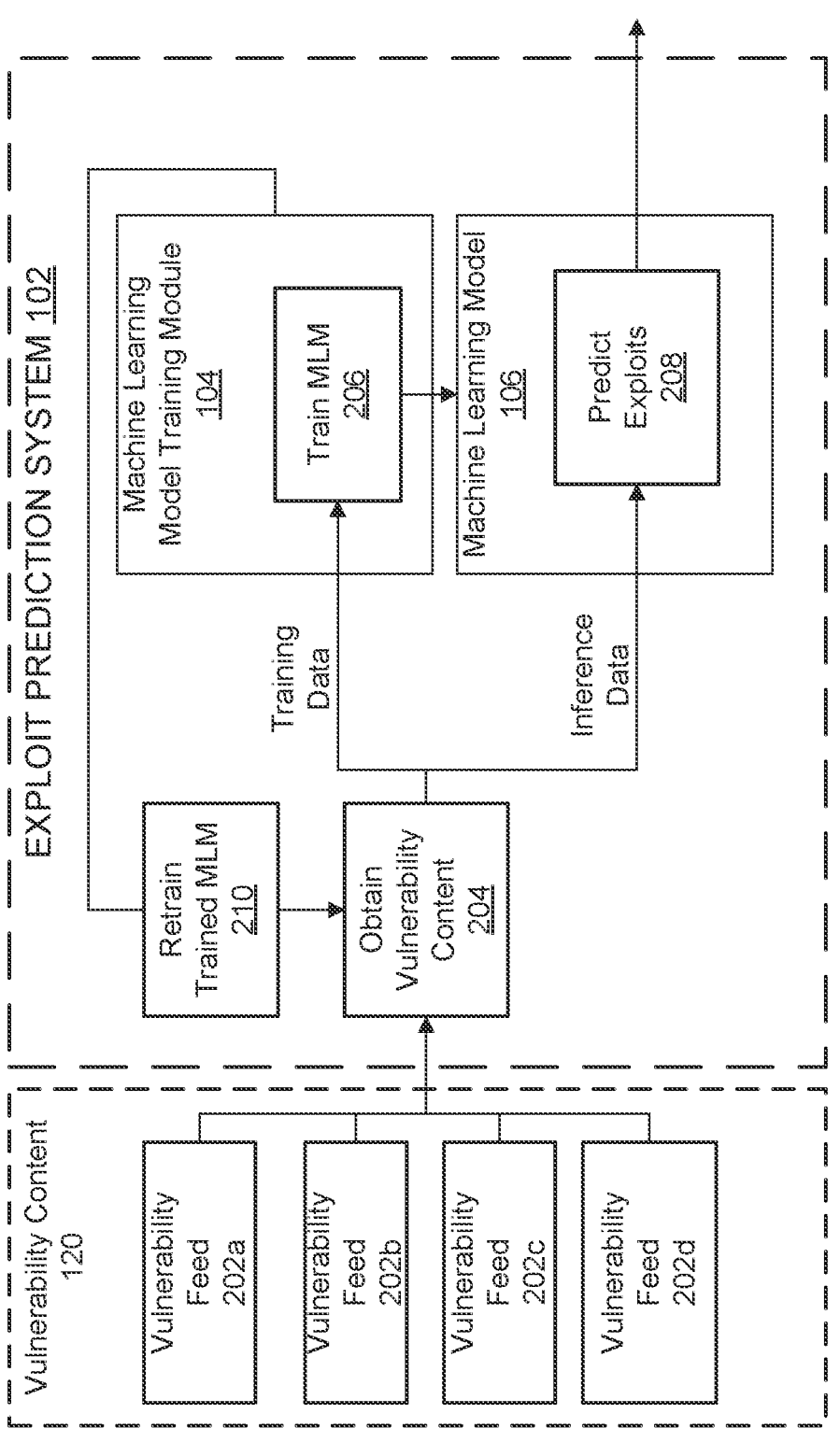
FIG. 2 is a data flow diagram illustrating an example of the training and retraining of a machine learning model.

FIG. 2 is a data flow diagram illustrating an example of the training and retraining of a machine learning model 106, as well as the prediction of exploitations of computer vulnerabilities. In the illustrated example, the exploit prediction system 102 receives vulnerability content 120 in the form of feeds 202*a*, 202*b*, 202*c*, 202*d* (individually or collectively referred to as feed(s) 202).

The exploit prediction system 102 may receive the feeds 202 on a periodic time schedule, such as, but not limited to, once an hour, once a day, once a week, once a month, once a year, or asynchronously, in real-time, etc. In some cases, different feeds 202 may provide the vulnerability content 120 at different times. Moreover, the time schedule of each feed may be adjusted based on training of the machine learning model 106 of exploit prediction system 102, expected performance outcomes of the machine learning model 106 of the exploit prediction system 102, among other metrics and/or expectations.

At block 204, the exploit prediction system 102 obtains the vulnerability content 120. As mentioned, the exploit prediction system 102 may obtain the vulnerability content 120 via push or pull mechanisms with the various data stores or systems that store the vulnerability content 120. As part of obtaining the vulnerability content 120, the exploit prediction system 102 may analyze and/or parse the vulnerability content 120 into different sets of data. (e.g., inference data and/or training data 130). The training data 130 may be sent to MLM training module 104 for training the machine learning model 106 and the inference data may be sent to a trained machine learning model 106 for predicting whether computer vulnerabilities will be exploited, when the computer vulnerabilities will be exploited, and/or the breadth of the exploitation.

At block 206, the exploit prediction system 102 trains the machine learning model 106 (e.g., using the MLM training module 104 and training data). With reference to the six sets of data described earlier, in some cases, the exploit prediction system 102 may use the first five sets of data (e.g., omitting the sixth set) as the training data.

As part of training the machine learning model 106, the exploit prediction system 102 may further partition the training data into different groups. The exploit prediction system 102 may use a first group of training data to select hyperparameters for the machine learning model 106, a second group of training data to validate or test the selected hyperparameters, a third group of training data to train the machine learning model 106 (e.g., modify the weights of nodes in the machine learning model 106), and a fourth group of training data to test the trained machine learning model 106 before deploying it for use to predict whether certain vulnerabilities will be exploited.

In some cases, the first and second group of training data may (together) comprise 20% of the training data. Within that 20%, the training data may be further split 80/20 between the first group and second group, respectively. In this way, the first group may comprise 16% of the training data and the second group may comprise 4% of the training data. As between the third and fourth group, the third group may comprise 80% of the 80% of training data (i.e., 64% of the total training data) and the fourth group may comprise 20% of the 80% of the training data (i.e., 16% of the total training data). However, it will be understood that the various groups can be divided up in a variety of ways at different percentages.

The exploit prediction system 102 may train the machine learning model 106 to predict whether certain currently unexploited vulnerabilities will be exploited at a future time and may generate a probability and/or risk score associated with that predicted exploitation. In doing this, the machine learning model 106 may be trained to identify trends and/or patterns within the first to fifth sets of data (also referred to as "training set") which may be used to predict whether computer vulnerabilities in the sixth set of data will be exploited and/or to predict whether computer vulnerabilities added to the vulnerability content 120 after the machine learning model 106 has been trained will be exploited.

At block 208, the exploit prediction system 102 (e.g., using a trained machine learning model 106) may predict whether computer vulnerabilities in the inference data will be exploited. As described herein, the inference data may include vulnerability content 120 that has been published (e.g., included as part of the vulnerability content 120) for less than the threshold time period and has not been exploited (e.g., the sixth set of data referenced above). For example, during training, the machine learning model 106 may learn patterns or extract features (also referred to as feature extractions) that may be used to accurately predict whether certain hardware or software vulnerabilities will be exploited.

At block 210, the machine learning model 106 may be retrained using updated training data to identify new patterns and/or trends which may be used to determine whether new vulnerabilities will become exploits. As described herein, the training data may change over time as new computer vulnerabilities are added to the vulnerability content 120 and/or as the computer vulnerabilities are exploited. Accordingly, as described herein, to reduce the use of a machine learning model 106 trained on outdated (and possibly now inaccurate data), the exploit prediction system 102 may retrain the machine learning model 106. As described herein, the exploit prediction system 102 may retrain the machine learning model 106 automatically without human intervention based on one or more thresholds (e.g., vulnerability exploitation threshold and/or added vulnerability threshold), or schedules. For example, the machine learning model 106 may be retrained every two hours and/or based on the quantity of new vulnerabilities added to the vulnerability content 120 exceeding an added vulnerability threshold and/or the number of new exploits (e.g., exploits that occurred for the first time after the machine learning model 106 was trained) exceeding a vulnerability exploitation threshold.

The exploit prediction system 102 may perform the functions described herein with reference to blocks 204-210 at various times. In some cases, some blocks may be performed at different non-overlapping time periods. For example, the MLM training module 104 may train the machine learning model 106 (block 206) during a first time period, the machine learning model 106 may predict exploits (block 208) a second time period, and the MLM training module 104 may retrain the machine learning model 106 (e.g., block 210 and block 206) during a third time period. In some such cases, the different time periods may be non-overlapping. For example, while the MLM training module 104 is training or retraining the machine learning model 106 (block 206 or block 210), the machine learning model 106 may be deactivated such that it does not predict exploits (block 210). Similarly, while the machine learning model 106 is predicting exploits (block 208), the MLM training module 104 may be deactivated such that it is not attempting to train or retrain the machine learning model 106 (block 206 or block 210).

In certain cases, some blocks may be performed concurrently. For example, during the aforementioned three time periods, the exploit prediction system 102 may continue to obtain vulnerability content 120 (block 204). Similarly, the exploit prediction system 102 may partition the vulnerability content 120 into inference data and training data. In some cases, as the machine learning model 106 is predicting exploits (block 208), the MLM training module 104 may be training a new machine learning model 106 that once trained, may replace the machine learning model 106. In some such cases, this may include determining the various weights for the nodes of the machine learning model 106.

Once determined, any changes or updates to the weights may be applied to the machine learning model 106.

Figure 3:
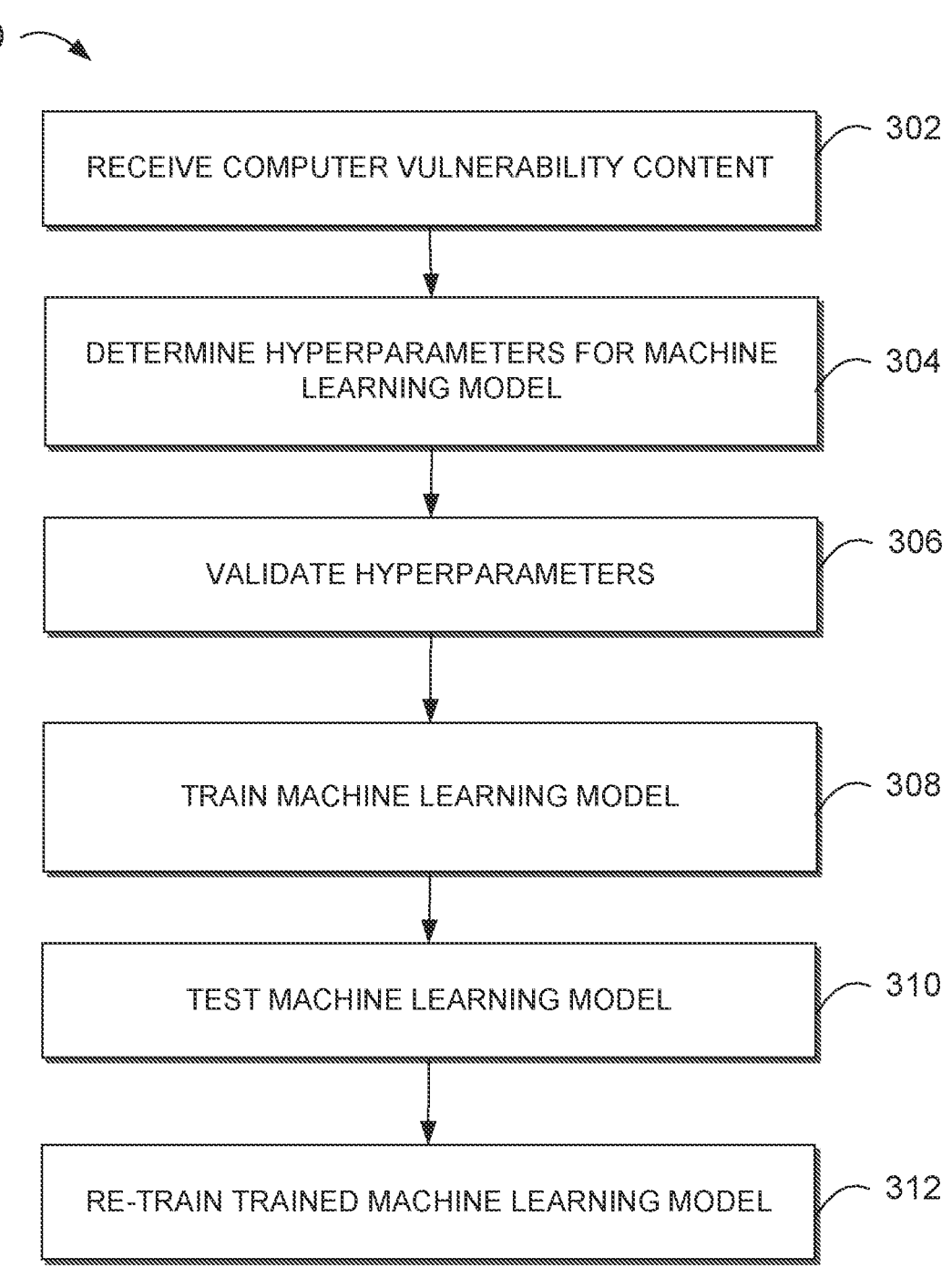
FIG. 3 is a flow diagram illustrating an example of a routine implemented by one or more computing devices to retrain a machine learning model.

FIG. 3 is a flow diagram illustrating an example of a routine 300 implemented by one or more computing devices to retrain a machine learning model 106. The flow diagram illustrated in FIG. 3 is provided for illustrative purposes only. It will be understood that one or more of the steps of the routine illustrated in FIG. 3 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 302, the exploit prediction system 102 may receive vulnerability content 120. As described herein, the exploit prediction system 102 may receive the vulnerability content 120 from one or more data stores or feeds of public and/or private entities. Some example public entities may be DHS CISA and NIST cybersecurity feeds. Moreover, some private entity feeds may be PolySwarm and Intel 471. As described herein, the exploit prediction system 102 may receive the vulnerability content 120 autonomically and/or retrieve the data manually, or a hybrid of both.

In some cases, the exploit prediction system 102 may partition the vulnerability content 120 into inference data and training data, and may use the training data to train the machine learning model 106. As described herein, in some cases, the training data may include the vulnerability content 120 that has been included in the vulnerability content 120 for more than a threshold time period or has been exploited.

Moreover, as described herein, the exploit prediction system 102 may further partition training data into different groups. A first group may include data used to determine and test the hyperparameters for the machine learning model 106. A second group (different and/or non-overlapping) may include data used to train (e.g., determine weights for) and test the machine learning model 106. Moreover, each group may include subgroups. For example, the first group may include a first subgroup to determine the hyper parameters and a second subgroup (different and/or non-overlapping) to validate or test the hyper parameters. As another example, the second group may include a first subgroup to train the machine learning model 106 and a second subgroup (different and/or non-overlapping) to validate or test the trained machine learning model 106.

At block 304, the exploit prediction system 102 determines the hyperparameters for the machine learning model 106 (e.g., for an MLP model). As discussed herein, hyperparameters for the machine learning model 106 may be tuned via use of a tuner, such as a Keras tuner. In some cases, the hyperparameters may include the number of hidden layers, number of units for each hidden layer, learning rate number of neurons, activation function, optimizer, batch size, and epochs-all of which may be used, but are not limited to, by the machine learning model 106 associated with exploit prediction system 102. In some cases, the exploit prediction system 102 determines the hyperparameters using a portion of the training data. For example, the exploit prediction system 102 may use the first subgroup of the first group of training data (referenced above) to determine the hyperparameters.

At block 306, the exploit prediction system 102 validates or tests the hyperparameters for the machine learning model 106. In some cases, the exploit prediction system 102 uses a second group of the training data (e.g., second subgroup of the first group described in the earlier example) to validate the hyperparameters. If the output of the machine learning model 106 using the selected hyperparameters does not satisfy one or more thresholds, the block 304 may be repeated again until testing confirms performance of the machine learning model 106 that satisfies the threshold. This may save time in the process of retraining the machine learning model 106 due to less wasted attempts at training and retraining the machine learning model 106 due at least to a less than optimal setup.

At block 308, the exploit prediction system 102 trains the machine learning model 106 to determine a probability of a computer vulnerability exploit and/or a risk score associated with the particular computer vulnerability. In some cases, the exploit prediction system 102 uses a third group of the training data (e.g., first subgroup of the second group described in the earlier example) to train the machine learning model 106. As part of training the machine learning model 106, the exploit prediction system 102 may determine one or more weights for one or more nodes for the machine learning model 106. In addition, as part of training, the training data may be sent through the machine learning model 106 and the output compared with an expected output (e.g., ground truth data). In some cases, the ground truth data may include the identity of the computer vulnerability, whether it was exploited, and when it was exploited. Whether it was exploited and when it was exploited may be compared to the predictions made by the machine learning model 106. Based on the comparison, one or more weights to one or more nodes may be modified. The process may be repeated hundreds, thousands, or millions of times, until the relevant training data (e.g., the third group) has been processed by the machine learning model 106 and the outputs used to modify the weightings of the nodes of the machine learning model 106.

At block 310, the exploit prediction system 102 tests the machine learning model 106. In some cases, the exploit prediction system 102 uses a fourth group of the training data (e.g., second subgroup of the second group described in the earlier example) to test or validate the machine learning model 106. In testing the machine learning model 106, the exploit prediction system 102 may have the machine learning model 106 process the fourth group of training data and compare its output (e.g., whether the vulnerability will be exploited and when) with a known output (e.g., ground truth data). Depending on the accuracy of the predictions, the exploit prediction system 102 may validate and/or fail the machine learning model 106. If it fails, the exploit prediction system 102 may repeat blocks 304-308. For example, if during testing it is determined that certain trends and/or patterns of vulnerability content 120 were not detected and/or a threshold number of exploits were not detected, the exploit prediction system 102 may repeat any one or any combination of blocks 304-308.

At block 312, the exploit prediction system 102 retrains the machine learning model 106. As described herein, the exploit prediction system 102 may retrain the machine learning model 106 in a variety of ways. In some cases, the exploit prediction system 102 retrains the machine learning model 106 according to a predetermined schedule or after a predetermined time period has passed (e.g., every two hours, once a day, week, month, or year, every six months, etc.).

In certain cases, the exploit prediction system 102 retrains the machine learning model 106 based on one or more changes to the vulnerability content 120 and/or based on one or more thresholds (e.g., added vulnerability threshold and/or vulnerability exploitation threshold). For example, based on the addition of new vulnerabilities to the vulnerability content 120 and/or the exploitation of vulnerabilities, the exploit prediction system 102 may automatically retrain the machine learning model 106.

This lapse of time may be adjusted on performance of the machine learning model 106. Also, by allowing automatic and/or autonomous retraining of the machine learning model 106, vulnerabilities likely to be exploited can be determined more quickly based on vulnerability information because there is no need for human checkpoints and/or intervention in order for the retraining to proceed. Once the lapse of time retraining schedule is set, the machine learning model 106 will make predictions on its own.

Fewer, more, or different steps may be included in the routine 300. As such, the flow shown in FIG. 3. is only meant to be an example of implementation using the components and/or embodiments herein. In some cases, between blocks 310 and 312, the machine learning model 106 may predict exploits within the inference data of the vulnerability content 120 and/or predict exploits for new computer vulnerabilities added to the vulnerability content 120 after the machine learning model 106 is trained.

Figure 4:
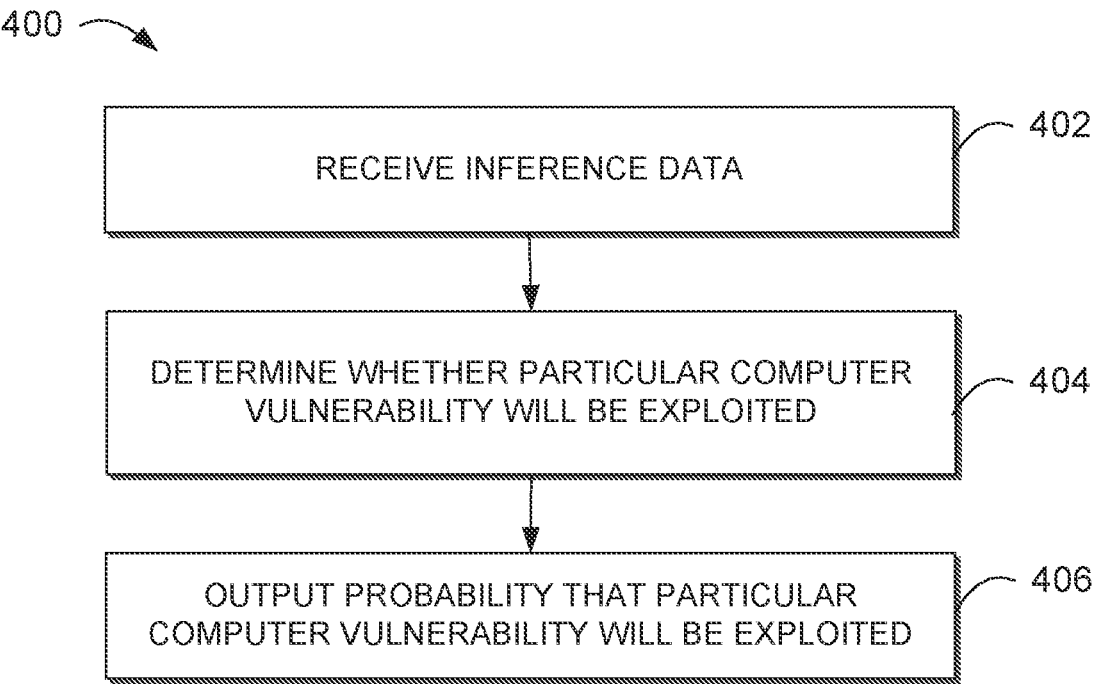
FIG. 4 is a flow diagram illustrating an example of a routine implemented by one or more processors to predict whether a computer vulnerability will be exploited (e.g., become an exploit).

FIG. 4 is a flow diagram illustrating an example of a routine 400 implemented by one or more processors to predict whether a computer vulnerability will be exploited (e.g., become an exploit). The flow diagram illustrated in FIG. 4 is provided for illustrative purposes only. It will be understood that one or more of the steps of the routine illustrated in FIG. 4 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 402, the exploit prediction system 102 receives inference data. In some cases, the inference data may include vulnerability content 120 (or a subset thereof, e.g., a subset that does not satisfy a threshold time period) received before and/or after the machine learning model 106 was trained. For example, the inference data may correspond to a set of the vulnerability content 120 received before the machine learning model 106 was trained and that was not used to train the machine learning model 106 and/or correspond to vulnerability content 120 received after the machine learning model 106 was trained. In certain cases, the inference data may be received from one or more feeds that identify computer vulnerabilities.

At block 404, the exploit prediction system 102 determines whether a particular computer vulnerability in the inference data will be exploited. In some cases, the exploit prediction system 102 uses a trained machine learning model 106 (e.g., MLP model) to predict whether the computer vulnerability will be exploited. As described herein, the inference data may identify computer vulnerabilities and when the vulnerabilities were detected. In some cases, the inference data includes vulnerability content 120 that has been published less than a threshold time period and that is not known to have been exploited (e.g., the vulnerability content 120 indicates that it has not been exploited).

As described herein, the machine learning model 106 may be trained using a portion of the vulnerability content 120 (e.g., the training data) that is different from the inference data (e.g., a second subset that is different than the first subset). For example, the exploit prediction system 102 may retrieve the vulnerability content 120 from the various data sources of feeds 202, partition the vulnerability content 120 into inference and training data, using the training data to train the machine learning model 106, and then use the trained machine learning model 106 to predict whether the computer vulnerabilities identified in the inference data will be exploited. In this way, the exploit prediction system 102 may use the same data sources for its training and inference. Put another away, different parts of the same (already existing) set of data may be used to train a machine learning model 106 and then used by the machine learning model 106 to predict whether a computer vulnerability will be exploited.

At block 406, the exploit prediction system 102 outputs whether a particular hardware vulnerability will be exploited, as a probability and/or as a risk score. This output may be delivered in a form of a report delivered to a destination. Alternatively, this output may be to a user interface, such as in a dashboard or otherwise in a real time or near real time user interface displaying predicted exploitation of certain vulnerability information. The dashboard may be customized with vulnerability and/or exploit content catered to a specific individual, and/or a group of individuals. For example, the dashboard may be customized for a chief information security officer (CISO) or a chief privacy office (CPO), etc., and the dashboard content may include key performance indicators (KPIs) and/or metrics concerning cybersecurity exploits and/or open vulnerabilities. Also, this output may be input into a data file that could be sent via an interface, such as an application protocol interface (API), to many destinations. Moreover, cybersecurity insurers or cybersecurity solution vendors may be determined based at least in part on a probability that a particular computer vulnerability will be exploited or a risk score, determined and/or generated by the exploit prediction system 102.

It will be understood that fewer, more, or different steps may be included in the routine 400. As such, the flow shown in FIG. 4 is only meant to be an example of implementation using the components and/or embodiments herein. For example, in some cases, as described herein, the exploit prediction system 102 may (automatically) retrain the machine learning model 106. In certain cases, the exploit prediction system 102 may retrain the machine learning model 106 based on a determination that a predetermined time period has passed. For example, the exploit prediction system 102 may retrain the machine learning model 106 every hour, day, week, etc. using updated vulnerability content 120 (which may be updated asynchronously).

In certain cases, the exploit prediction system 102 may retrain the machine learning model 106 based on a determination that the vulnerability content 120 (or set of computer vulnerability data) has changed. The change may be due to a change in the inference data (first subset of data) or a change in the training data (second subset of data). As non-limiting examples of the determined change, the exploit prediction system 102 may determine that a certain number (e.g., a threshold number) of computer vulnerabilities in the training data that were previously not exploited have been exploited or that a threshold number of computer vulnerabilities have been added to the training data (or to the vulnerability content 120).

As additional non-limiting examples of the determined change, the exploit prediction system 102 may determine that a certain number (e.g., a threshold number) of computer vulnerabilities in the inference data that were previously not exploited have been exploited and/or have aged to satisfy a threshold time period (e.g., been published for longer than the threshold time period), and/or are to be reassigned from the inference data to the training data.

Based on the determined change(s), the exploit prediction system 102 may retrain the machine learning model 106 using updated training data. The retrained machine learning model 106 may then determine a probability of exploitation of computer vulnerabilities in the updated inference data.

Figure 5:
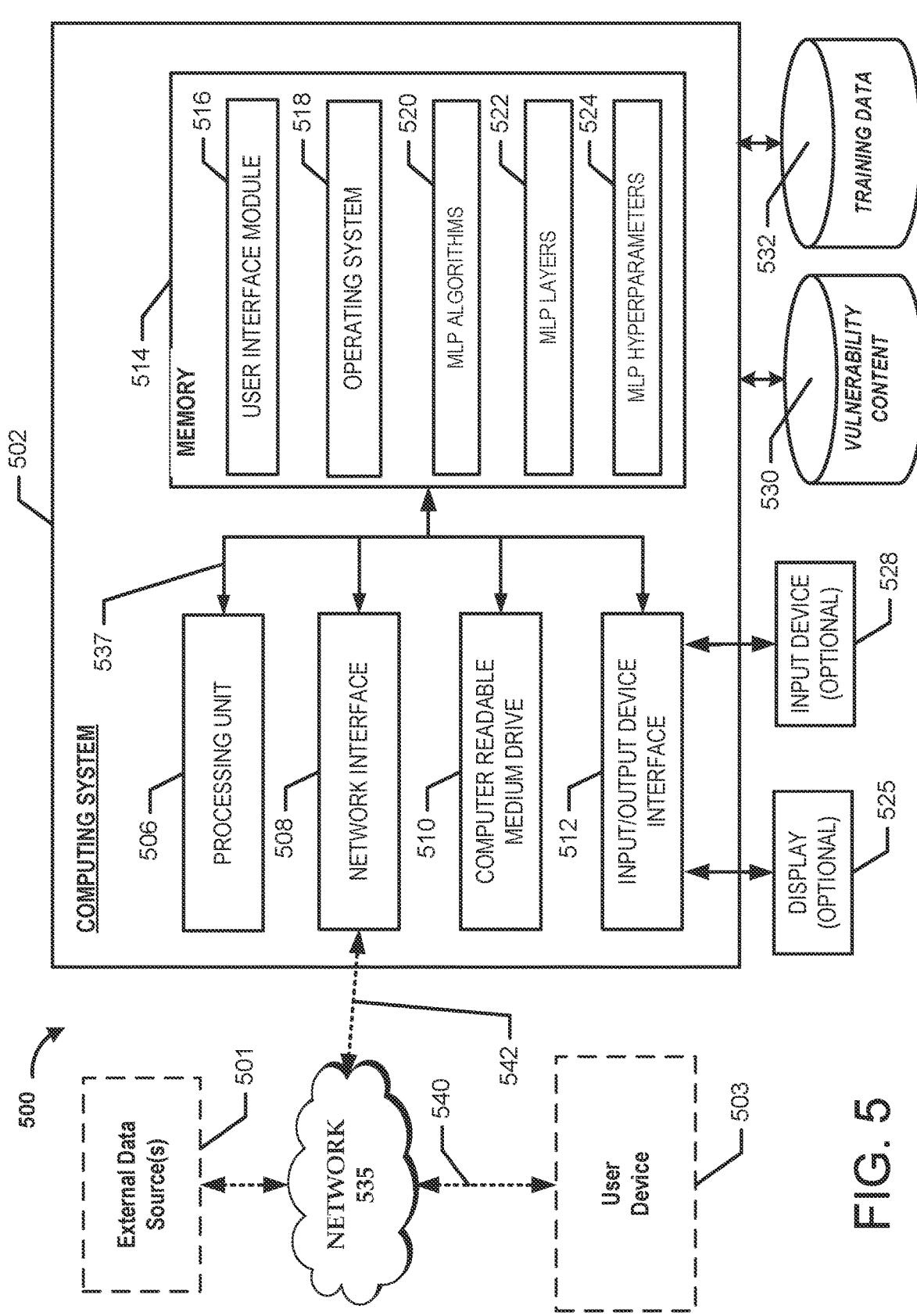
FIG. 5 is a block diagram depicting an illustrative architecture for a computing system that may implement one or more of the features described herein.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506 (e.g., microprocessor. FPGA, or other hardware processor), a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on a user device 503.

In some embodiments, the memory 514 may include MLP algorithm(s) 520, MLP layers 522, and MLP hyperparameters 524. In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional external data source 501, such as one or more data sources that store vulnerability content 120 and/or training data 130.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Various example embodiments of the disclosure can be described by the following clauses:

Clause 1. A computer-implemented method, comprising: receiving a first set of data comprising computer vulnerability content data, wherein the first set of data identifies a plurality of computer vulnerabilities; determining, using a first portion of the first set of data, first hyperparameters for a multilayer perceptron (MLP) model; validating the first hyperparameters based on a second portion of the first set of data; based at least in part on the first hyperparameters and a third portion of the first set of data, training the MLP model to determine a probability that computer vulnerabilities will be exploited; testing the trained MLP model using a fourth portion of the first set of data; and retraining the trained MLP model, based at least in part on a determination that a predetermined period of time has elapsed, by using a second set of data comprising computer vulnerability content data that is different from the first set of data.

Clause 2. The computer-implemented method of clause 1, wherein at least one of the first portion, second portion, third portion, or fourth portion of the first set of data comprises computer vulnerability content data determined, by a third party, to be exploited less than a threshold time period.

Clause 3. The computer-implemented method of clause 1 or 2, further comprising retaining a fifth portion of the set of data as inference data to be used by the trained MLP model to determine a probability that a particular computer vulnerability will be exploited.

Clause 4. The computer-implemented method of any of clauses 1-3, wherein at least one of the first portion, second portion, third portion, or fourth portion comprises computer vulnerability content data determined, by a third party, to be (i) exploited more than a threshold time period and (ii) less than two standard deviations of an error.

Clause 5. The computer-implemented method of any of clauses 1-4, wherein at least one of the first portion, second portion, third portion, or fourth portion of the set of data comprises computer vulnerability content data determined, by a third party, to be (i) exploited more than a threshold time period and (ii) more than two standard deviations of an error.

Clause 6. The computer-implemented method of any of clauses 1-5, wherein at least one of the first portion, second portion, third portion, or fourth portion of the set of data comprises computer vulnerability content data determined, by a third party, to be (i) not be exploited more than a threshold time period and (ii) be less than two standard deviations of an error.

Clause 7. The computer-implemented method of claim any of clauses 1-6, wherein at least one of the first portion, second portion, third portion, or fourth portion of the set of data comprises computer vulnerability content data determined, by a third party, to be (i) not be exploited more than a threshold time period and (ii) be more than two standard deviations of an error.

Clause 8. The computer-implemented method of any of clauses 1-7, wherein the predetermined period of time is less than, or equal to, two hours.

Clause 9. The computer-implemented method of any of clauses 1-8, wherein the first set of data is received as structured data, and wherein the first set of data is annotated prior to determining the first hyperparameters.

Clause 10. The computer-implemented method of any of clauses 1-9, wherein the hyperparameters are determined by a Keras Tuner.

Clause 11. The computer-implemented method of any of clauses 1-10, wherein retraining the trained MLP model comprises retraining the trained MLP model based at least in part on a determination that a quantity of computer vulnerabilities added to the trained MLP model satisfies an added vulnerability threshold.

Clause 12. The computer-implemented method of any of clauses 1-11, wherein retraining the trained MLP model comprises retraining the trained MLP model based at least in part on a determination that a quantity of vulnerabilities exploited since the trained MLP model was last trained satisfies a vulnerability exploitation threshold.

Clause 13. A system, comprising: a data store; and one or more processors configured to: receive a first set of data comprising computer vulnerability content data, wherein the first set of data identifies a plurality of computer vulnerabilities; determine, using a first portion of the first set of data, first hyperparameters for a multilayer perceptron (MLP) model; validate the first hyperparameters based on a second portion of the first set of data; based at least in part on the first hyperparameters and a third portion of the first set of data, training the MLP model to determine a probability that computer vulnerabilities will be exploited; test the trained MLP model using a fourth portion of the first set of data; and retrain the trained MLP model, based at least in part on a determination that a predetermined period of time has elapsed, by using a second set of data comprising computer vulnerability content data that is different from the first set of data.

Clause 14. The system of clause 13, wherein at least one of the first portion, second portion, third portion, or fourth portion of the first set of data comprises computer vulnerability content data determined, by a third party, to be exploited less than a threshold time period.

Clause 15. The system of clause 13 or 14, the one or more processors further configured to comprise retaining a fifth portion of the set of data as inference data to be used by the trained MLP model to determine a probability that a particular computer vulnerability will be exploited.

Clause 16. The system of any of clauses 13-15, wherein at least one of the first portion, second portion, third portion, or fourth portion comprises computer vulnerability content data determined, by a third party, to be (i) exploited more than a threshold time period and (ii) less than two standard deviations of an error.

Clause 17. A non-transitory computer-readable media including computer-executable instructions that, when executed by a computing system, cause the computing system to: receive computer vulnerability content data corresponding to a plurality of computer vulnerabilities; determine, using a trained machine learning model, at least one of a probability that a particular computer vulnerability of the plurality of computer vulnerabilities will be exploited or a risk score associated with the particular computer vulnerability; and cause display, via a user interface, of the at least one of the probability that the particular computer vulnerability will be exploited or the risk score.

Clause 18. The non-transitory computer-readable media of clause 17, wherein the computer vulnerability content data is a first subset of computer vulnerability content data of a set of computer vulnerability content data, wherein a second subset of computer vulnerability content data of the set of computer vulnerability content data is used to train the trained machine learning model.

Clause 19. The non-transitory computer-readable media of clause 17 or 18, wherein the computer-executable instructions further cause the computing system to: determine that at least a portion of the first subset of computer vulnerability content data has changed; and based on the determining that the at least a portion of the first subset of computer vulnerability content data has changed, reassigning the at least a portion of the first subset of computer vulnerability content data to the second subset of computer vulnerability content data thereby forming an updated first subset of computer vulnerability content data and an updated second subset of computer vulnerability content data; retrain the trained machine learning model using the updated second subset of computer vulnerability content data; and determine, using the retrained machine learning model, at least one of a probability that a second particular computer vulnerability identified in the updated first subset of computer vulnerability content will be exploited or a risk score associated with the second particular computer vulnerability.

Clause 20. The non-transitory computer-readable media of any of clauses 17-19, wherein the computer-executable instructions further cause the computing system to: determine that a threshold quantity of data has been added to the set of computer vulnerability content data thereby forming an updated set of computer vulnerability content data; determine an updated first subset of computer vulnerability content data of the updated set of computer vulnerability content data based on a threshold time period, wherein the updated first subset of computer vulnerability content data does not satisfy the threshold time period; determine an updated second subset of computer vulnerability content data of the updated set of computer vulnerability content data based on the threshold time period, wherein the updated second subset of computer vulnerability content data satisfies the threshold time period; retrain the trained machine learning model using the updated second subset of computer vulnerability content data; and determine, using the retrained machine learning model, at least one of a probability that a second particular computer vulnerability identified in the updated first subset of computer vulnerability content will be exploited or a risk score associated with the second particular computer vulnerability.

Clause 21. A method comprising: receiving computer vulnerability content data corresponding to a plurality of computer vulnerabilities; determining, using a trained machine learning model, at least one of a probability that a particular computer vulnerability of the plurality of computer vulnerabilities will be exploited or a risk score associated with the particular computer vulnerability; and causing display, via a user interface, of the at least one of the probability that the particular computer vulnerability will be exploited or the risk score.

Clause 22. The method of clause 21, wherein the machine learning model is a multilayer perceptron (MLP) model.

Clause 23. The method of clause 21 or 22, wherein the computer vulnerability content data is a first subset of computer vulnerability content data of a set of computer vulnerability content data, wherein a second subset of computer vulnerability content data of the set of computer vulnerability content data is used to train the trained machine learning model.

Clause 24. The method of any of clauses 21-23, further comprising: determining that at least a portion of the second subset of computer vulnerability content data has changed; and based on the determining that the at least a portion of the second subset of the computer vulnerability content data has changed, retraining the trained machine learning model using the changed second subset of computer vulnerability content data.

Clause 25. The method of any of clauses 21-24, further comprising: determining that at least a portion of the first subset of computer vulnerability content data satisfies a time period threshold; based on the determining that at least a portion of the first subset of computer vulnerability content data satisfies a time period threshold, reassigning the at least a portion of the first subset of computer vulnerability content data to the second subset of computer vulnerability content data thereby forming an updated first subset of computer vulnerability content data and an updated second subset of computer vulnerability content data; retraining the trained machine learning model using the updated second subset of computer vulnerability content data; and determining, using the retrained machine learning model, at least one of a probability that a second particular computer vulnerability identified in the updated first subset of computer vulnerability content will be exploited or a risk score associated with the second particular computer vulnerability.

Clause 26. The method of any of clauses 21-25, further comprising: determining that at least a portion of the first subset of computer vulnerability content data has changed;

and based on the determining that the at least a portion of the first subset of computer vulnerability content data has changed, reassigning the at least a portion of the first subset of computer vulnerability content data to the second subset of computer vulnerability content data thereby forming an updated first subset of computer vulnerability content data and an updated second subset of computer vulnerability content data; retraining the trained machine learning model using the updated second subset of computer vulnerability content data; and determining, using the retrained machine learning model, at least one of a probability that a second particular computer vulnerability identified in the updated first subset of computer vulnerability content will be exploited or a risk score associated with the second particular computer vulnerability.

Clause 27. The method of any of clauses 21-26, further comprising: determining that a threshold quantity of data has been added to the set of computer vulnerability content data thereby forming an updated set of computer vulnerability content data; determining an updated first subset of computer vulnerability content data of the updated set of computer vulnerability content data based on a threshold time period, wherein the updated first subset of computer vulnerability content data does not satisfy the threshold time period; determining an updated second subset of computer vulnerability content data of the updated set of computer vulnerability content data based on the threshold time period, wherein the updated second subset of computer vulnerability content data satisfies the threshold time period; retraining the trained machine learning model using the updated second subset of computer vulnerability content data; and determining, using the retrained machine learning model, at least one of a probability that a second particular computer vulnerability identified in the updated first subset of computer vulnerability content will be exploited or a risk score associated with the second particular computer vulnerability.

Clause 28. The method of any of clauses 21-27, further comprising: determining that a predetermined time period has passed; determining an updated first subset of computer vulnerability content data of an updated set of computer vulnerability content data based on a threshold time period, wherein the updated first subset of computer vulnerability content data does not satisfy the threshold time period; determining an updated second subset of computer vulnerability content data of the updated set of computer vulnerability content data based on the threshold time period, wherein the updated second subset of computer vulnerability content data satisfies the threshold time period; retraining the trained machine learning model using the updated second subset of computer vulnerability content data; and determining, using the retrained machine learning model, at least one of a probability that a second particular computer vulnerability identified in the updated first subset of computer vulnerability content will be exploited or a risk score associated with the second particular computer vulnerability.

Clause 29. A system, comprising: a data store; and one or more processors configured to: receive computer vulnerability content data corresponding to a plurality of computer vulnerabilities; determine, using a trained machine learning model, at least one of a probability that a particular computer vulnerability of the plurality of computer vulnerabilities will be exploited or a risk score associated with the particular computer vulnerability; and cause display, via a user interface, of the at least one of the probability that the particular computer vulnerability will be exploited or the risk score.

Clause 30. The system of clause 29, wherein the machine learning model is a multilayer perceptron (MLP) model.

Clause 31. The system of clause 29 or 30, wherein the computer vulnerability content data is a first subset of computer vulnerability content data of a set of computer vulnerability content data, wherein a second subset of computer vulnerability content data of the set of computer vulnerability content data is used to train the trained machine learning model.

Clause 32. The system of any of clauses 29-31, wherein the one or more processors further configured to: determine that at least a portion of the second subset of computer vulnerability content data has changed; and based on the determining that the at least a portion of the second subset of the computer vulnerability content data has changed, retraining the trained machine learning model using the changed second subset of computer vulnerability content data.

Clause 33. The system of any of clauses 29-32, wherein the one or more processors further configured to: determine that at least a portion of the first subset of computer vulnerability content data satisfies a time period threshold; based on the determining that at least a portion of the first subset of computer vulnerability content data satisfies a time period threshold, reassigning the at least a portion of the first subset of computer vulnerability content data to the second subset of computer vulnerability content data thereby forming an updated first subset of computer vulnerability content data and an updated second subset of computer vulnerability content data; retrain the trained machine learning model using the updated second subset of computer vulnerability content data; and determine, using the retrained machine learning model, at least one of a probability that a second particular computer vulnerability identified in the updated first subset of computer vulnerability content will be exploited or a risk score associated with the second particular computer vulnerability.

Clause 34. The system of any of clauses 29-33, wherein the one or more processors further configured to: determine that at least a portion of the first subset of computer vulnerability content data has changed; and based on the determining that the at least a portion of the first subset of computer vulnerability content data has changed, reassigning the at least a portion of the first subset of computer vulnerability content data to the second subset of computer vulnerability content data thereby forming an updated first subset of computer vulnerability content data and an updated second subset of computer vulnerability content data; retrain the trained machine learning model using the updated second subset of computer vulnerability content data; and determine, using the retrained machine learning model, at least one of a probability that a second particular computer vulnerability identified in the updated first subset of computer vulnerability content will be exploited or a risk score associated with the second particular computer vulnerability.

Clause 35. The system any of clauses 29-34, wherein the one or more processors further configured to: determining that a threshold quantity of data has been added to the set of computer vulnerability content data thereby forming an updated set of computer vulnerability content data; determining an updated first subset of computer vulnerability content data of the updated set of computer vulnerability content data based on a threshold time period, wherein the updated first subset of computer vulnerability content data does not satisfy the threshold time period; determining an updated second subset of computer vulnerability content data of the updated set of computer vulnerability content data based on the threshold time period, wherein the updated second subset of computer vulnerability content data satisfies the threshold time period; retrain the trained machine learning model using the updated second subset of computer vulnerability content data; and determine, using the retrained machine learning model, at least one of a probability that a second particular computer vulnerability identified in the updated first subset of computer vulnerability content will be exploited or a risk score associated with the second particular computer vulnerability.

Clause 36. The system of any of clauses 29-35, wherein the one or more processors further configured to: determine that a predetermined time period has passed; determine an updated first subset of computer vulnerability content data of an updated set of computer vulnerability content data based on a threshold time period, wherein the updated first subset of computer vulnerability content data does not satisfy the threshold time period; determine an updated second subset of computer vulnerability content data of the updated set of computer vulnerability content data based on the threshold time period, wherein the updated second subset of computer vulnerability content data satisfies the threshold time period; retrain the trained machine learning model using the updated second subset of computer vulnerability content data; and determine, using the retrained machine learning model, at least one of a probability that a second particular computer vulnerability identified in the updated first subset of computer vulnerability content will be exploited or a risk score associated with the second particular computer vulnerability.

Clause 37. A non-transitory computer-readable media including computer-executable instructions that, when executed by a computing system, cause the computing system to: receive computer vulnerability content data corresponding to a plurality of computer vulnerabilities; determine, using a trained machine learning model, at least one of a probability that a particular computer vulnerability of the plurality of computer vulnerabilities will be exploited or a risk score associated with the particular computer vulnerability; and cause display, via a user interface, of the at least one of the probability that the particular computer vulnerability will be exploited or the risk score.

Clause 38. The non-transitory computer-readable media of clause 37, wherein the machine learning model is a multilayer perceptron (MLP) model.

Clause 39. The non-transitory computer-readable media of clause 37 or 38, wherein the computer vulnerability content data is a first subset of computer vulnerability content data of a set of computer vulnerability content data, wherein a second subset of computer vulnerability content data of the set of computer vulnerability content data is used to train the trained machine learning model.

Clause 40. The non-transitory computer-readable media of any of clauses 37-39, wherein the computer-executable instructions further cause the computing system to: determine that at least a portion of the second subset of computer vulnerability content data has changed; and based on the determining that the at least a portion of the second subset of the computer vulnerability content data has changed, retraining the trained machine learning model using the changed second subset of computer vulnerability content data.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A computer-implemented method, comprising:

retrieving a first set of data comprising computer vulnerability content data, wherein the first set of data identifies a plurality of computer vulnerabilities;

determining, using a first portion of the first set of data, first hyperparameters for a multilayer perceptron (MLP) model;

validating the first hyperparameters based on a second portion of the first set of data;

based at least in part on the first hyperparameters and a third portion of the first set of data, training the MLP model to determine a probability that computer vulnerabilities will be exploited;

testing the trained MLP model using a fourth portion of the first set of data;

detecting, using the trained MLP model, computer vulnerability exploits;

retrieving, after a predetermined period of time and without human intervention, a second set of data comprising computer vulnerability content data, wherein the second set of data is different from the first set of data; and retraining, after the predetermined period of time and without human intervention, the trained MLP model, wherein retraining the trained MLP model comprises: modifying at least one hyperparameter of the first hyperparameters and retraining the trained MLP model using the at least one modified hyperparameter of the first hyperparameters and at least a portion of the second set of data, wherein the predetermined period of time is less than or equal to one month.

2. The computer-implemented method of claim 1, wherein at least one of the first portion, second portion, third portion, or fourth portion of the first set of data comprises computer vulnerability content data determined, by a third party, to be exploited less than a threshold time period.

3. The computer-implemented method of claim 1, wherein at least one of the first portion, second portion, third portion, or fourth portion comprises computer vulnerability content data determined, by a third party, to be (i) exploited more than a threshold time period and (ii) less than two standard deviations of an error.

4. The computer-implemented method of claim 1, wherein at least one of the first portion, second portion, third portion, or fourth portion of the first set of data comprises computer vulnerability content data determined, by a third party, to be (i) exploited more than a threshold time period and (ii) more than two standard deviations of an error.

5. The computer-implemented method of claim 1, wherein at least one of the first portion, second portion, third portion, or fourth portion of the first set of data comprises computer vulnerability content data determined, by a third party, to be (i) not be exploited more than a threshold time period and (ii) be less than two standard deviations of an error.

6. The computer-implemented method of claim 1, wherein at least one of the first portion, second portion, third portion, or fourth portion of the first set of data comprises computer vulnerability content data determined, by a third party, to be (i) not be exploited more than a threshold time period and (ii) be more than two standard deviations of an error.

7. The computer-implemented method of claim 1, wherein the predetermined period of time is less than or equal to two hours.

8. The computer-implemented method of claim 1, wherein the first set of data is received as structured data, and wherein the first set of data is annotated prior to determining the first hyperparameters.

9. The computer-implemented method of claim 1, wherein the first hyperparameters are determined by a Keras Tuner.

10. The computer-implemented method of claim 1, wherein retraining the trained MLP model comprises retraining the trained MLP model based at least in part on a determination that a quantity of computer vulnerabilities added to the trained MLP model satisfies an added vulnerability threshold.

11. The computer-implemented method of claim 1, wherein retraining the trained MLP model comprises retraining the trained MLP model based at least in part on a determination that a quantity of vulnerabilities exploited since the trained MLP model was last trained satisfies a vulnerability exploitation threshold.

12. A system, comprising:

a data store; and one or more processors configured to:

retrieve a first set of data comprising computer vulnerability content data, wherein the first set of data identifies a plurality of computer vulnerabilities;

determine, using a first portion of the first set of data, first hyperparameters for a multilayer perceptron (MLP) model;

validate the first hyperparameters based on a second portion of the first set of data;

based at least in part on the first hyperparameters and a third portion of the first set of data, training the MLP model to determine a probability that computer vulnerabilities will be exploited;

test the trained MLP model using a fourth portion of the first set of data;

detect, using the trained MLP model, computer vulnerability exploits;

retrieve, after a predetermined period of time and without human intervention, a second set of data comprising computer vulnerability content data, wherein the second set of data is different from the first set of data; and retrain, after the predetermined period of time and without human intervention, the trained MLP model, wherein to retrain the trained MLP model, the one or more processors are further configured to: modify at least one hyperparameter of the first hyperparameters and retrain the trained MLP model using the at least one modified hyperparameter of the first hyperparameters and at least a portion of the second set of data, wherein the predetermined period of time is less than or equal to one month.

13. The system of claim 12, wherein at least one of the first portion, second portion, third portion, or fourth portion of the first set of data comprises computer vulnerability content data determined, by a third party, to be exploited less than a threshold time period.

14. The system of claim 12, wherein at least one of the first portion, second portion, third portion, or fourth portion comprises computer vulnerability content data determined, by a third party, to be (i) exploited more than a threshold time period and (ii) less than two standard deviations of an error.

15. A non-transitory computer-readable media including computer-executable instructions that, when executed by a computing system, cause the computing system to:

retrieve a first set of data comprising computer vulnerability content data, wherein the first set of data identifies a plurality of computer vulnerabilities;

determine, using a first portion of the first set of data, first hyperparameters for a multilayer perceptron (MLP) model;

validate the first hyperparameters based on a second portion of the first set of data;

based at least in part on the first hyperparameters and a third portion of the first set of data, training the MLP model to determine a probability that computer vulnerabilities will be exploited;

test the trained MLP model using a fourth portion of the first set of data;

detect, using the trained MLP model, computer vulnerability exploits;

retrieve, after a predetermined period of time and without human intervention, a second set of data comprising computer vulnerability content data, wherein the second set of data is different from the first set of data; and retrain, after the predetermined period of time and without human intervention, the trained MLP model, wherein to retrain the trained MLP model, the computer-executable instructions further cause the computing system to modify at least one hyperparameter of the first hyperparameters and retrain the trained MLP model using the at least one modified hyperparameter of the first hyperparameters and at least a portion of the second set of data, wherein the predetermined period of time is less than or equal to one month.

16. The non-transitory computer-readable media of claim 15, wherein the first set of data comprising computer vulnerability content data is a first subset of computer vulnerability content data of a set of computer vulnerability content data.

17. The non-transitory computer-readable media of claim 16, wherein the first hyperparameters are first hyperparameters of a set of hyperparameters, wherein the computer-executable instructions further cause the computing system to:

determine that at least a portion of the first subset of computer vulnerability content data has changed;

based on the determining that the at least a portion of the first subset of computer vulnerability content data has changed, reassigning the at least a portion of the first subset of computer vulnerability content data to a second subset of computer vulnerability content data comprising second computer vulnerability content data thereby forming an updated first subset of computer vulnerability content data and an updated second subset of computer vulnerability content data;

retrain the trained MLP model using the updated second subset of computer vulnerability content data, wherein to retrain the trained MLP model, the computer-executable instructions further cause the computing system to, without human intervention, modify second hyperparameters of the set of hyperparameters and retrain the trained MLP model using the second modified hyperparameters; and determine, using the retrained MLP model, at least one of a probability that a second particular computer vulnerability identified in the updated first subset of computer vulnerability content data will be exploited or a risk score associated with the second particular computer vulnerability.

18. The non-transitory computer-readable media of claim 16, wherein the computer-executable instructions further cause the computing system to:

determine that a threshold quantity of data has been added to the set of computer vulnerability content data thereby forming an updated set of computer vulnerability content data;

determine an updated first subset of computer vulnerability content data of the updated set of computer vulnerability content data based on a threshold time period, wherein the updated first subset of computer vulnerability content data does not satisfy the threshold time period;

determine an updated second subset of computer vulnerability content data of the updated set of computer vulnerability content data based on the threshold time period, wherein the updated second subset of computer vulnerability content data satisfies the threshold time period;

retrain, without human intervention the trained MLP model using the updated second subset of computer vulnerability content data, wherein to retrain the trained MLP model, the computer-executable instructions further cause the computing system to modify third hyperparameters of the set of hyperparameters and retrain the trained MLP model using the third modified hyperparameters; and determine, using the retrained MLP model, at least one of a probability that a second particular computer vulnerability identified in the updated first subset of computer vulnerability content data will be exploited or a risk score associated with the second particular computer vulnerability.

* * * * *